(12) United States Patent
Lee

(10) Patent No.: US 8,731,073 B1
(45) Date of Patent: May 20, 2014

(54) IN-BAND LANE ALIGNMENT FOR A MULTI-LANE TRANSCEIVER

(71) Applicant: Broadcom Corporation, Irvine, CA (US)

(72) Inventor: Whay Sing Lee, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/804,195

(22) Filed: Mar. 14, 2013

Related U.S. Application Data

(60) Provisional application No. 61/766,997, filed on Feb. 20, 2013.

(51) Int. Cl.
*H04B 3/00* (2006.01)
*H04L 25/00* (2006.01)

(52) U.S. Cl.
USPC ........... 375/257; 375/219; 375/220; 375/354; 375/371; 370/516; 370/517; 370/519; 713/401; 713/503; 713/500

(58) Field of Classification Search
CPC ............ H04L 25/0272; H04L 25/0292; H04L 25/028; H04L 25/08; H04L 7/0008; H04L 27/2601; H04L 1/0025; H04L 25/0266; H04L 7/033; H04L 25/06; H04L 5/023; H04L 7/02; H04L 7/0331; H04L 7/0337; H04L 7/0338; H04L 47/10; H04L 29/06523; H04L 1/205; H04L 12/66; H04L 25/14; H04B 1/40; H04B 3/23; H04B 1/403; H04M 11/06; H03L 7/0814; G06F 1/10; G06F 1/12; G06F 13/1698; G06F 1/08; G06F 1/04; G06F 1/14; G06F 1/3203; H04J 3/0632; H04J 3/0626; H04J 3/06; H04J 3/00; H04J 3/0682; H04J 3/0685; H04Q 11/0478; H04Q 11/04; G11C 7/222; G11C 7/22
USPC ................ 375/257, 219, 220, 354, 371, 226; 370/516, 517, 519; 702/107, 89; 713/401, 503, 500
See application file for complete search history.

(56) References Cited

U.S. PATENT DOCUMENTS

| | | | | |
|---|---|---|---|---|
| 7,467,056 | B2 * | 12/2008 | Maniloff et al. .............. | 702/107 |
| 7,650,525 | B1 * | 1/2010 | Chang et al. .................. | 713/500 |
| 7,664,146 | B1 * | 2/2010 | Reches .......................... | 370/516 |
| 2009/0063889 | A1 * | 3/2009 | Dada et al. .................... | 713/503 |
| 2010/0008460 | A1 * | 1/2010 | Zhang et al. .................. | 375/376 |
| 2012/0106687 | A1 * | 5/2012 | Bulzacchelli et al. ........ | 375/354 |

\* cited by examiner

*Primary Examiner* — Phuong Phu
(74) *Attorney, Agent, or Firm* — Fiala & Weaver P.L.L.C.

(57) ABSTRACT

Methods, systems, and apparatuses are described for aligning lanes of low speed serial links coupled to a transceiver. The transceiver cooperatively performs lane alignment operations with a low speed device during initialization of the transceiver and the low speed device. The lane alignment operations are performed in-band using the low speed serial links, and therefore, do not require additional out-of-band-signaling wires between the transceiver and the low speed device to perform the lane alignment operations. The lane alignment operations may be performed by a handshaking process performed by the transceiver and the low speed device, where the transceiver and the low speed device provide training pattern(s) of data that are used to align the low speed serial links. The low speed serial links are continuously monitored after initialization is complete to detect various transient impairments and to re-initiate lane alignment operations in response to detecting such impairments.

20 Claims, 9 Drawing Sheets

IN-BAND LANE ALIGNMENT FOR A MULTI-LANE TRANSCEIVER

CROSS-REFERENCE TO RELATED APPLICATIONS

This application claims priority to U.S. Provisional Patent Application No. 61/766,997, filed Feb. 20, 2013, the entirety of which is incorporated by reference herein.

BACKGROUND

1. Technical Field

The present invention relates to communication systems, and in particular, to multi-lane communication systems.

2. Background Art

Communication systems for transmitting data may operate according to a number of standards and implementations. Such communication systems may include one or more communication channels for transmitting and receiving data. Some of such communication channels may include a transceiver that receives a serial data stream and de-serializes the serial data stream to transmit the data stream over multiple slower data rate data streams than the received serial data stream. Conversely, such a transceiver may also receive a de-serialized data stream in the form of multiple data streams and generate a combined serialized data stream to provide the data stream at a faster data rate that was received in de-serialized form. Such a transceiver may be referred to as a SERDES (serializer/deserializer) transceiver. SERDES transceivers may be used in a wide range of communication systems and devices, such as mobile devices, desktop computers and servers, computer networks, and telecommunication networks.

The de-serialized data stream is provided to the transceiver via a plurality of lanes. Some or all of these lanes may vary in physical length. Therefore, data traveling over the different lanes may arrive at the transceiver at varying times due to differences in latency incurred due to the differences in physical length of the lanes. When serializing the data received via the lanes, the data may be serialized in an incorrect order if the data received via each of these lanes is not properly aligned.

Various techniques have been used to align the lanes before serializing the data received in the lanes into a serial data stream. For example, the X Attachment Unit Interface ("XAUI") addresses this problem by using alignment columns (which consist of four consecutive ALIGN control characters) that are periodically inserted into the data stream provided via the lanes. When the data stream is serialized, the XAUI transceiver must explicitly delay ("deskew") the data received via each of the lanes such that the alignment column remains intact in the serial data stream. Subsequently, the XAUI transceiver continues to monitor the arrival of alignment columns to detect whether the lanes are out of alignment.

The alignment columns may be generated and inserted as part of the serial data stream provided by the XAUI transceiver, or may be removed by the XAUI transceiver before providing the serial data stream. However, both of these approaches have their disadvantages. For example, with the former approach, the upper layers of an associated protocol stack must be modified to support the alignment columns. With the latter approach, the aggregate raw throughput of XAUI transceiver is different where the alignment column data is included in the data stream compared to where the alignment column data is not included in the data stream, thereby complicating the design of the XAUI transceiver (e.g., complexity in generating clock signals to handle the different data throughput rates, etc.).

BRIEF SUMMARY

Methods, systems, and apparatuses are described for aligning low speed serial links of a SERDES transceiver, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Introduction

Figure 1:
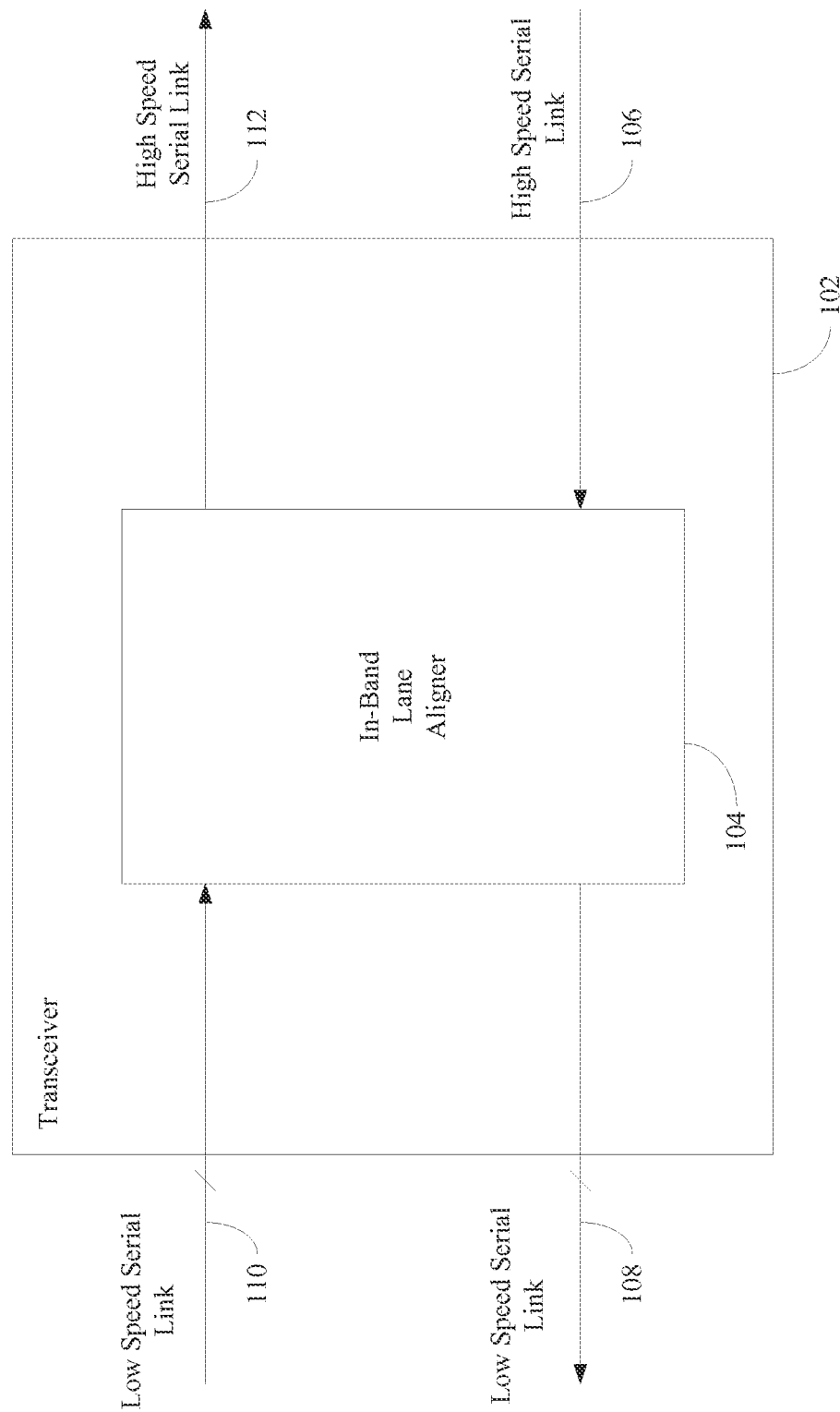
FIG. 1 depicts a block diagram of a transceiver including an in-band lane aligner, according to an example embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Furthermore, terminology used herein to refer to data as being "mission traffic" refers to externally-generated data transmitted to, through, and from a transceiver from and to devices coupled to the transceiver during normal operation of the transceiver (i.e., after initialization of the transceiver has been completed). Examples of "mission traffic" include, but are not limited to, externally-generated data received from other devices communicatively coupled to a transceiver by one or more high speed serial links and/or one or more low speed serial links. Terminology used herein to refer to serial links as being a "high speed serial link" refers to a serial link capable of transmitting serial data streams at multi-gigabit data rates (e.g., 10 Gbit/s, 40 Gbit/s, or 100 Gbit/s). Terminology used herein to refer to serial links as being a "low speed serial link" refers to a serial link that transmits a de-serialized version of the serialized data stream transmitted by the "high speed serial link."

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

In embodiments, a transceiver is described herein for aligning lanes of low speed serial links coupled thereto. The transceiver cooperatively performs lane alignment operations with a low speed device coupled thereto during initialization of the transceiver and the low speed device. The lane alignment operations are performed in-band using the low speed serial links, and therefore, do not require additional out-of-band-signaling wires between the transceiver and the low speed device to perform the lane alignment operations. The lane alignment operations may be performed using a handshaking process performed by the transceiver and the low speed device, where the transceiver and the low speed device provide training pattern(s) of data that are used to align the low speed serial links. The low speed serial links are continuously monitored after initialization is complete to detect various transient impairments and to re-initiate lane alignment operations in response to detecting such impairments.

In particular, methods for aligning low speed serial lanes of low speed serial links are described herein. In accordance with an example method, a first instance of a first training pattern of data is transmitted over a plurality of first lanes by a lane alignment master of a first device to a lane alignment slave of a second device. A first indication is received from a lane alignment slave of the first device. The lane alignment slave of the first device is configured to perform a lane alignment operation on a plurality of second lanes using a second instance of the first training pattern of data received from a lane alignment master of the second device over the plurality of second lanes. The first indication indicates that the plurality of second lanes has been aligned. In response to receiving the first indication, a first instance of a second training pattern is transmitted over the plurality of first lanes from the lane alignment master of the first device to the lane alignment slave of the second device. A second indication is received from the lane alignment slave of the first device. The second indication indicates that the lane alignment slave of the first device has received a second instance of the second training pattern of data from the lane alignment master of the second device over the plurality of second lanes.

In accordance with another example method, an instance of a first training pattern of data is received over a plurality of first lanes by a lane alignment slave of a first device from a lane alignment master of a second device. A lane alignment operation is performed on the plurality of first lanes using the instance of the first training pattern of data received from the lane alignment master of the second device. A determination is made whether the lane alignment operation has aligned the plurality of first lanes. In response to determining that the lane alignment operation has aligned the plurality of first lanes, a first indication from the lane alignment slave of the first device is transmitted to the lane alignment master of the first device.

Furthermore, a lane alignment slave of a first device is configured to align serial lanes of a serial link. According to one embodiment, the lane alignment slave includes a receiver interface and a lane aligner. The receiver interface is coupled to a plurality of first lanes. The receiver interface is configured to receive an instance of a first training pattern of data over the plurality of first lanes from a lane alignment master of a second device. The lane aligner is configured to perform a lane alignment operation on the plurality of first lanes using the instance of the first training pattern of data received from the lane alignment master of the second device. The lane aligner is further configured to determine whether the lane alignment operation has aligned the plurality of first lanes. In response to a determination that the lane alignment operation has aligned the plurality of first lanes, the lane alignment slave of the first device provides a first indication to a lane alignment master of the first device.

Examples of these embodiments and further embodiments are described in the following sub-sections.

Example Transceiver Including an In-band Lane Aligner

Embodiments for performing alignment of multiple lanes of related data streams may be implemented in various ways. For instance, FIG. 1 depicts a block diagram of a transceiver 102 including an in-band lane aligner 104, according to an embodiment. In an embodiment, transceiver 102 is a SERDES transceiver. Transceiver 102 may be configured to bridge between a device that provides and consumes a first rate of data, such as high speed data (i.e., a high speed device), and a device that provides and consumes a second rate of data different from the first rate, such as low speed data (i.e., a low speed device). Transceiver 102 may be configured to receive a serial data stream from a higher speed device over high speed serial link 106, de-serialize the data, and provide the de-serialized data to a lower speed device over low speed serial link 108. Conversely, transceiver 102 may be configured to receive data from the lower speed device over low speed serial link 110, serialize the data, and provide the serialized data stream to the higher speed device over high speed serial link 112. Each of low speed serial links 108 and 110 may comprise a plurality of low speed serial lanes. In embodiments, for each of low speed serial links 108 and 110, the de-serialized data may be transmitted on the low speed serial lanes in a round-robin or other manner.

During initialization of transceiver 102, in-band aligner 104 and an in-band lane aligner of the low speed device are configured to cooperatively perform lane alignment operations on the low speed serial lanes of low speed serial links 108, 110. The lane alignment operations correct lane-to-lane skew that may be experienced across the low speed serial lanes. By performing lane alignment operations, the data transmissions received over each of the low speed serial lanes are properly aligned, and therefore, are able to be serialized in the correct order. For example, suppose that low speed serial link 110 includes two lanes, where even words (e.g., n, n+2, n+4, etc.) are transmitted to transceiver 102 over the first lane, and odd words (e.g., n+1, n+3, n+5, etc.) are transmitted to transceiver 102 over the second lane. The even words provided over the first lane and the odd words provided over the second lane may be received by transceiver 102 at different times due to differences in latency between the first lane and the second lane. For example, each of the first lane and second lane may have different physical lengths that contribute to the differences in latency. If transceiver 102 were to serialize the odd and even words without performing a lane alignment operation, the odd and even words may be serialized in an incorrect order (e.g., n, n+3, n+2, n+5, etc. instead of the correctly-sequenced order of n, n+1, n+2, n+3, n+4, etc.). It is noted that the 2-lane configuration described above is purely exemplary and that low speed serial links 108, 110 may include any number of lanes (e.g., 4 lanes, 6 lanes, 8 lanes, etc.).

As is described below, the lane alignment operations are performed without requiring any modification to the data stream received during normal operation of transceiver 102. Instead, the lane alignment operations are performed during initialization of transceiver 102. In addition, the lane alignment operations described herein are performed without requiring additional signaling wires between transceiver 102 and the low speed device coupled thereto (e.g., alignment columns are not needed). Instead, the lane alignment operations are performed in-band using low speed serial links 108 and 110. As such, the lane alignment operations are performed without additional out-of-band signals. As is described below, the lane alignment operations may be performed using a handshaking process performed by in-band lane aligner 104 and the in-band lane aligner of the low speed device, where each lane aligner provides training pattern(s) of data that are used to align low speed serial links 108, 110. Additional details regarding the lane alignment operations performed between in-band lane aligner 104 and the in-band lane aligner of the low speed device are discussed below with reference to FIGS. 2-9.

After completion of the lane alignment operations, the initialization for transceiver 102 is complete, and in-band lane aligner 104 switches from providing training pattern(s) of data to the low speed device to providing mission traffic (e.g., data received over high speed serial link 106) to the low speed device over low speed serial link 108. Similarly, the in-band lane aligner of the low speed device switches from providing training pattern(s) of data to transceiver 102 to providing mission traffic (e.g., data received from a data provider coupled thereto) to transceiver 102 over low speed serial link 110. In-band lane aligner 104 continues to monitor low speed serial link 110 and the in-band lane aligner of the low speed device continues to monitor low speed serial link 108 to detect various transient impairments (e.g., a loss of synchronization or alignment) and re-initiate lane alignment operations in response to detecting such impairments. In this way, in-band lane aligner 104 and the in-band lane aligner of the low speed device are self-healing in that low speed serial links 108, 110 are automatically reinitialized and realigned upon detecting such transient impairments.

Figure 2:
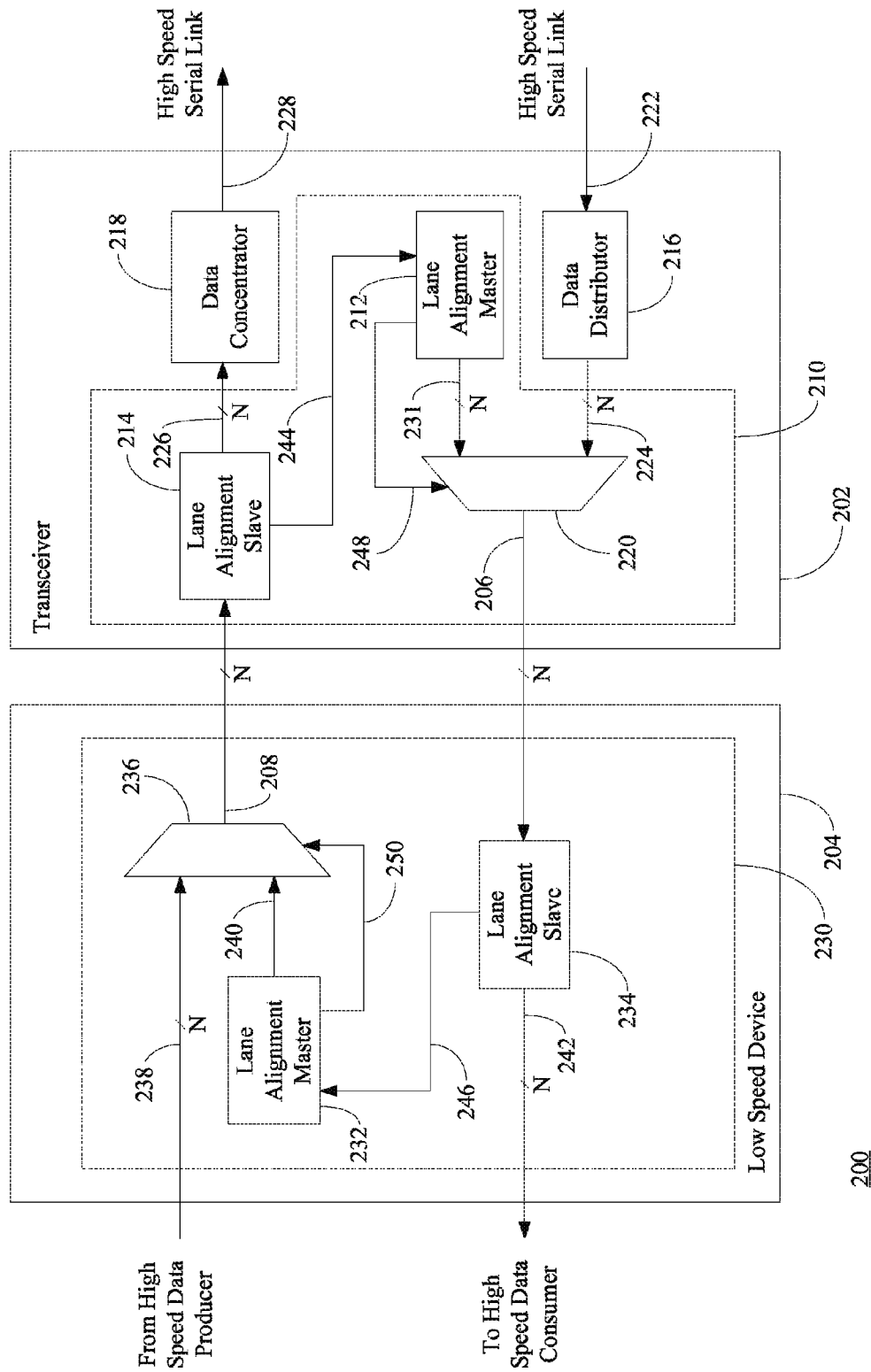
FIG. 2 depicts a block diagram of an example of the transceiver of FIG. 1 coupled to a low speed device, according to an embodiment.

Transceiver 102 of FIG. 1 may be implemented in various ways, in embodiments. For instance, FIG. 2 depicts a detailed block diagram of a communication system 200 including a transceiver 202 communicatively coupled to a device 204 over low speed serial links 206, 208, according to an embodiment. Transceiver 202 is an example of transceiver 102. In one embodiment, transceiver 202 is a SERDES transceiver. As shown in FIG. 2, transceiver 202 includes an in-band lane aligner 210, data distributor 216, and data concentrator 218. In-band lane aligner 210 includes lane alignment master 212, lane alignment slave 214, and selection logic 220. Transceiver 202 is configured to receive a serial data stream over high speed serial link 222. In one embodiment, the serial data stream may be encoded using an 8b/10b encoding scheme. It will be recognized that encoding schemes in addition to or in lieu of the 8b/10b encoding scheme may be used to encode the serial data stream.

In an embodiment, device 204 may be referred to as "low speed" device 204 when device 204 communicates with transceiver 202 to transmit or receive multiple lanes of lower speed data streams over each of low speed serial links 206 and 208, relative to a second device (e.g., a "high speed" device) that communicates with transceiver 202 to transmit or receive higher speed data streams over high speed serial links 222 and 228. The features of system 200 are described in further detail as follows.

Data distributor 216 is configured to receive the serial data stream received over high speed serial link 222 and de-serialize the serial data stream into an N number of parallel data signals, where N is the number of low speed serial lanes that are included in each of low speed serial links 206, 208. The de-serialized data stream is transmitted to selection logic 220 over lines 224 (e.g., a plurality of electrical signal conductors, etc.).

Selection logic 220 is configured to provide either the de-serialized data stream or instances of pattern(s) of data transmitted by lane alignment master 212 to low speed device 204 over low speed serial link 206 depending on the operational mode of transceiver 202. For example, during normal operation (i.e., after initialization of transceiver 202), selection logic 220 is configured to provide mission traffic (e.g., the de-serialized data stream received over lines 224). During initialization of transceiver 202, selection logic 220 is configured to provide instances of pattern(s) of data transmitted by lane alignment master 212 over lines 231. The data outputted by selection logic 220 is controlled by a control signal received over line 248. For example, when the control signal is asserted (e.g., has a corresponding low or high signal level), selection logic 220 may output instances of pattern(s) of data transmitted by lane alignment master 212. When the control signal is de-asserted (e.g., has a corresponding high or low signal level), selection logic 220 may output the de-serialized data stream. As is described below, the instances of pattern(s) of data are transmitted to perform lane alignment operations on low speed data serial links 206, 208.

Transceiver 202 is further configured to receive N parallel data signals (i.e. a de-serialized data stream) from low speed device 204 over low speed serial link 208. The N parallel data signals are received by lane alignment slave 214. Lane alignment slave 214 is configured to either pass the N parallel data signals to data concentrator 218 over lines 226 or perform lane alignment operations on low speed serial link 208. For example, during normal operation, lane alignment slave 214 is configured to provide the N parallel data signals to data concentrator 218 over lines 226. During initialization of transceiver 202, lane alignment slave 214 is configured to perform lane alignment operations on low speed serial link 208. During initialization, the N parallel data signals may not be provided to data concentrator 218. Additional detail regarding the lane alignment operations performed by lane alignment slave 214 is described further below.

Data concentrator 218 is configured to receive the N parallel data signals over lines 226 and serialize the N number of parallel data signals into a serial data stream. The serial data stream is transmitted to a device communicatively coupled to transceiver 202 over high speed serial link 228. For instance, data concentrator 218 may sequentially insert a packet, frame, or other segment of data from each of the N parallel data signals of lines 226 in a round-robin or other manner to generate the serial data stream that is transmitted over high speed serial link 228.

Low speed device 204 may be a transceiver configured to provide data received over low speed serial link 206 to a data consumer communicatively coupled thereto over lines 242 and provide data received from a data producer over lines 238 to transceiver 202 over low speed serial link 208. Low speed device 204 may be in a device that is physically separate from a device of the data consumer and/or data producer, or may be integrated the same device. As shown in FIG. 2, low speed device 204 includes an in-band lane aligner 230. In-band lane aligner 230 includes lane alignment master 232, lane alignment slave 234, and selection logic 236. Low speed device 204 is configured to receive N parallel data signals from the data producer over lines 238. The N parallel data signals are transmitted to selection logic 236 over lines 238.

Selection logic 236 is configured to provide either the N parallel data signals or instances of pattern(s) of data transmitted by lane alignment master 232 to transceiver 202 over low speed serial link 208 depending on the operational mode of low speed device 204. For example, during normal operation (i.e., after initialization of low speed device 204), selection logic 236 is configured to provide mission traffic (e.g., the N parallel data signals received over lines 238). During initialization of low speed device 204, selection logic 236 is configured to provide instances of pattern(s) of data transmitted by lane alignment master 232. The data outputted by selection logic 236 over low speed serial link 208 is controlled by a control signal received over line 250. For example, when the control signal is asserted, selection logic 236 may output instances of pattern(s) of data provided by lane alignment master 232. When the control signal is de-asserted, selection logic 236 may output the N parallel data signals received over lines 238. As is described below, the instances of pattern(s) of data are transmitted to perform lane alignment operations on low speed data serial links 206, 208.

Low speed device 204 is further configured to receive N parallel data signals from transceiver 202 over low speed serial link 206. The N parallel data signals are transmitted to lane alignment slave 234. Lane alignment slave 234 is configured to either pass the N parallel data signals to the data consumer over lines 242 or perform lane alignment operations on low speed serial link 206. For example, during normal operation, lane alignment slave 234 is configured to provide the N parallel data signals to the data consumer over lines 242. During initialization of low speed device 204, lane alignment slave 234 performs lane alignment operations on low speed serial link 206. During initialization, the N parallel data signals may not be transmitted to the data consumer. Additional detail regarding the lane alignment operations performed by lane alignment slave 234 is described further below.

In-band aligner 210 of transceiver 202 and in-band aligner 230 of low speed device 204 are configured to cooperatively perform lane alignment operations on low speed serial links 206, 208. The lane alignment operations may be performed during initialization of transceiver 202 and low speed device 204 and/or at other times as desired. The lane alignment operations begin with lane alignment master 212 of in-band lane aligner 210 providing instances of a first training pattern of data to lane alignment slave 234 of in-band aligner 230 and lane alignment master 232 of in-band aligner 230 providing instances of the first training pattern of data to lane alignment slave 214 of in-band lane aligner 210. Lane alignment master 212 provides the instances of the first training pattern of data to lane alignment slave 234 over low speed serial link 206. Lane alignment master 232 provides the instances of the first training pattern of data to lane alignment slave 214 over low speed serial link 208. The instances of first training patterns of data may contain one or more control characters that are in accordance to an encoding scheme used for data transmissions to and from transceiver 202 and low speed device 204. In an embodiment, the providing of the first training patterns of data may be initiated by lane alignment master 212 and by lane alignment master 232 at a same time or at different times, without needing to be synchronized with each other (e.g., no need for lane alignment master 212 and lane alignment master 232 to communicate directly with each other to begin).

Lane alignment slave 214 uses one or more designated control characters included in the instances of the first training patterns of data received from lane alignment master 232 to synchronize and de-skew low speed serial link 208. In an embodiment, lane alignment slave 214 introduces a delay into one or more lanes of the low speed serial lanes of low speed serial link 208 such that the designated control character(s) received over each of the low speed serial lanes are properly aligned. Lane alignment slave 234 uses the designated control character(s) included in the instances of first training pattern of data received from lane alignment master 212 to synchronize and de-skew low speed serial link 206. In an embodiment, lane alignment slave 234 introduces a delay into one or more lanes of the low speed serial lanes of low speed serial link 206 such that the designated control character(s) received over each of the low speed serial lanes are properly aligned. The delays introduced by lane alignment slave 214 and/or lane alignment slave 234 are maintained so that subsequent data transmissions between transceiver 202 and low speed device 204 are aligned. The delays are maintained until at least one of the low speed serial link 206 and low speed serial link 208 experiences a loss of synchronization. A loss of synchronization may occur, for example, in the event that transceiver 202 and/or low speed device 204 are reset, transceiver 202 and/or low speed device 204 experience a loss of power, at least one of high speed serial link 222 and high speed serial link 228 have been disconnected, etc.

Lane alignment master 212 continues to provide instances of the first training pattern of data until lane alignment slave 214 provides an indicator to lane alignment master 212, which indicates that lane alignment slave 214 has aligned the low speed serial lanes of low speed serial link 208. The indicator is transmitted to lane alignment master 212 over line 244. Similarly, lane alignment master 232 continues to provide instances of the first training pattern of data until lane alignment slave 234 provides an indicator to lane alignment master 232, which indicates that lane alignment slave 234 has aligned the low speed serial lanes of low speed serial link 206. The indicator is transmitted to lane alignment master 232 over line 246.

Thereafter, lane alignment master 212 provides instances of a second training pattern of data in response to receiving the indicator over line 244. Similarly, lane alignment master 232 provides instances of the second training pattern of data in response to receiving the indicator over line 246. The instances of second training patterns of data may also contain one or more control characters that are in accordance to the particular encoding scheme used for data transmissions to and from transceiver 202 and low speed device 204. The first training pattern of data and the second training pattern of data may be different training patterns of data. In one embodiment, the second training pattern of data differs from the first training pattern of data by using different designated control character(s) for lane alignment purposes. In another embodiment, the first training pattern of data and the second training pattern of data may differ in padding data that is transmitted in between the control character(s) used for lane alignment purposes. Lane alignment slave 214 may be configured to align the low speed serial lanes of low speed serial link 208 using the either the instances of the first training pattern of data or the instances of the second training pattern of data. Similarly, lane alignment slave 234 may be configured to align the low speed serial lanes of low speed serial link 206 using the either the instances of the first training pattern of data or the instances of the second training pattern of data.

Lane alignment master 212 continues to provide instances of the second training pattern of data until lane alignment slave 214 provides an indicator to lane alignment master 212, which indicates that lane alignment slave 214 has received instances of the second training pattern of data from lane alignment master 232. This indicator signifies that lane alignment slave 234 has aligned the low speed serial lanes of low speed serial link 206. The indicator is transmitted to lane alignment master 212 over line 244. Similarly, lane alignment master 232 continues to provide instances of the second training pattern of data until lane alignment slave 234 provides an indicator to lane alignment master 232, which indicates that lane alignment slave 234 has received instances of the second training pattern of data from lane alignment master 212. This indicator signifies that lane alignment slave 214 has aligned the low speed serial lanes of low speed serial link 208. The indicator is transmitted to lane alignment master 232 over line 246.

Subsequently, lane alignment master 212 continues to provide instances of the second training pattern of data for a predetermined number of times in response to receiving the indicator over line 244 to inform lane alignment slave 234 that the low speed serial lanes of low speed serial link 208 have been aligned. Lane alignment master 212 de-asserts a control signal over line 248 in response to determining that the instances of the second training pattern of data have been provided a predetermined number of times. The control signal de-asserted over line 248 causes selection logic 220 to switch from providing the instances of training patterns of data to providing mission traffic (e.g., data received over high speed serial link 222 that has been de-serialized by data distributor 216). Selection logic 220 provides the de-serialized data stream to low speed device 230 over low speed serial link 206. Lane alignment slave 234 receives the de-serialized data stream and provides the de-serialized data to the data consumer over line 242, with one or more lanes delayed according to any corresponding delay determined by lane alignment slave 234 as described above.

Similarly, lane alignment master 232 continues to provide instances of the second training pattern of data for a predetermined number of times in response to receiving the indicator over line 246 to inform lane alignment slave 214 that the low speed serial lanes of low speed serial link 206 have been aligned. Lane alignment master 232 de-asserts a control signal line 250 in response to determining that the instances of the second training pattern of data have been provided a predetermined number of times. The control signal de-asserted over line 250 causes selection logic 236 to switch from providing the instances of training patterns of data to providing mission traffic (e.g., data received from the data producer over line 238). The data received from the data producer is transmitted to transceiver 202 over low speed serial link 208. Lane alignment slave 214 provides the data to data concentrator 218 over lines 226, with one or more lanes delayed according to any corresponding delay determined by lane alignment slave 214 as described above, and data concentrator 218 serializes the data and provides the serial data stream over high speed serial link 228.

Lane alignment slave 214 and lane alignment slave 234 continuously monitor the low speed serial links 206, 208 for illegal data patterns that cause violations of an encoding scheme (e.g., an 8B/10B decoding scheme) used to transmit data between transceiver 202 and low speed device 204. The illegal data patterns may take the form of any bit stream that does not conform to the particular encoding scheme used to transmit and receive data between transceiver 202 and low speed device 204. In the event that lane alignment slave 214 determines that the number of violations detected reaches a predetermined threshold, lane alignment slave 214 provides an indication to lane alignment master 212. The indication indicates that low speed serial link 208 has lost synchronization (i.e., the data received over low speed serial link 208 is no longer reliably received). In response to receiving the indicator, lane alignment master 212 re-initiates the lane alignment operations. In the event that lane alignment slave 234 determines that the number of violations detected reaches a predetermined threshold, lane alignment slave 234 provides an indication to lane alignment master 232. The indication indicates that low speed serial link 206 has lost synchronization (i.e., the data received over low speed serial link 206 is no longer reliably received). In response to receiving the indicator, lane alignment master 232 re-initiates the lane alignment operations.

Example Lane Alignment Master Embodiments

Figure 3:
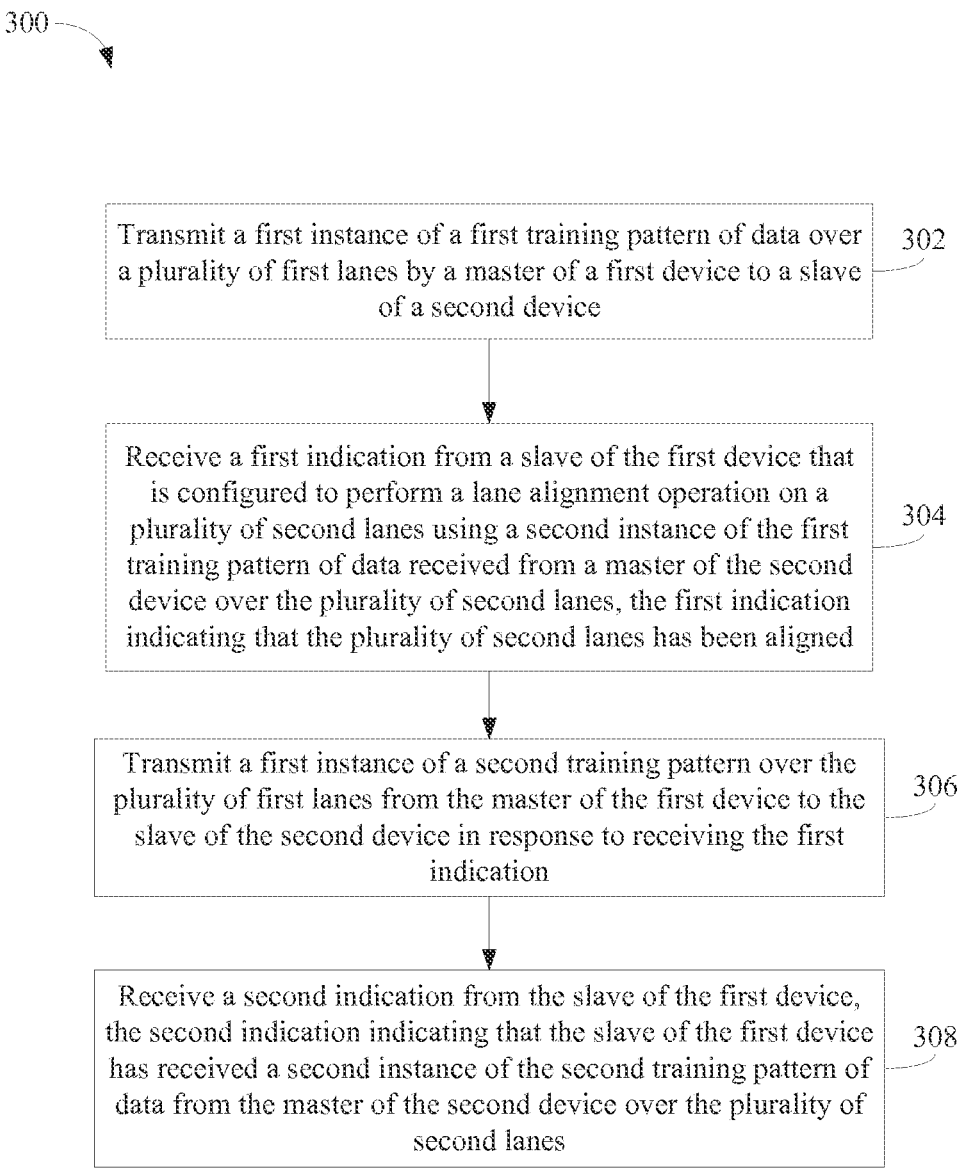
FIG. 3 shows a flowchart providing an example process performed by a lane alignment master for aligning a low speed serial link, according to an example embodiment.
Figure 4:
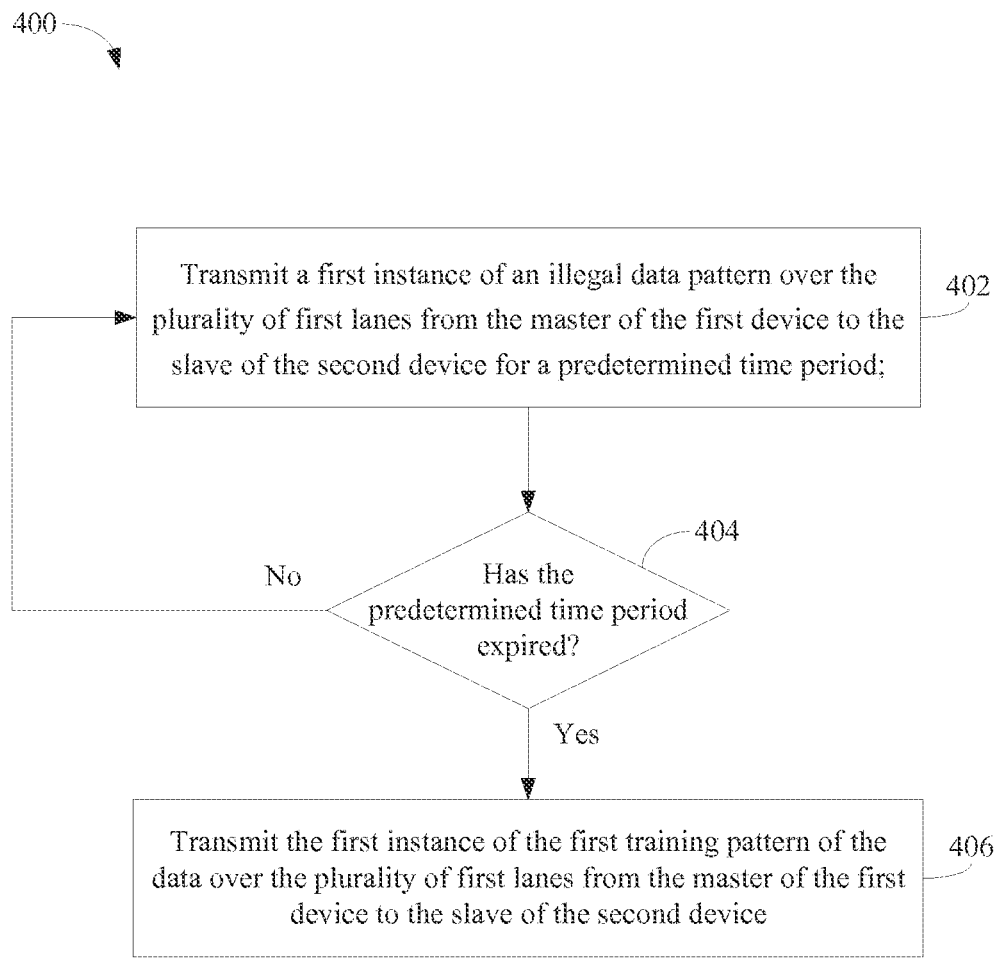
FIG. 4 shows a flowchart providing an example process performed by a lane alignment master for providing instance(s) of a first training pattern of data, according to an example embodiment.
Figure 5:
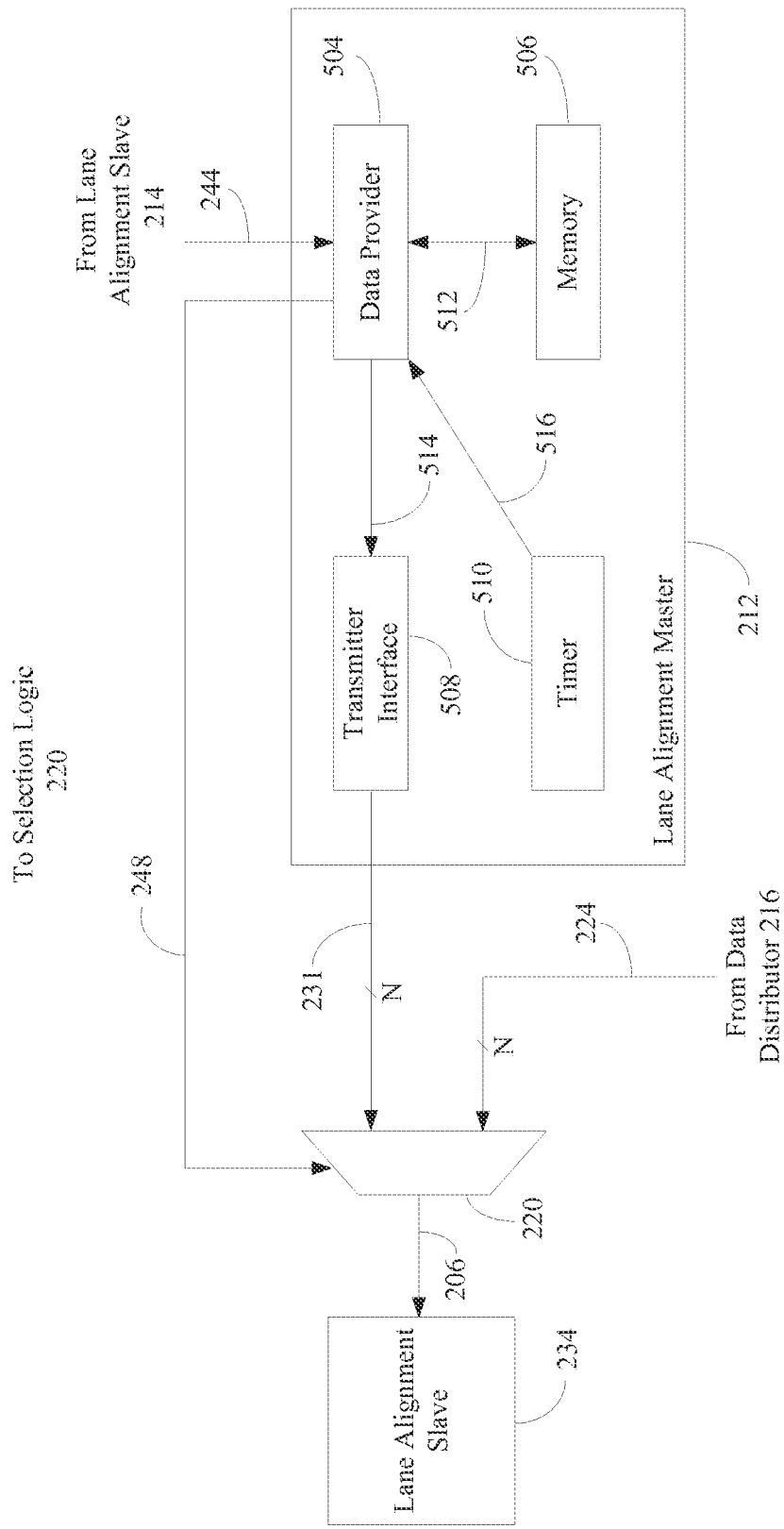
FIG. 5 depicts a block diagram of a lane alignment master of a first device coupled to a lane alignment slave of a second device, according to an example embodiment.

Accordingly, in embodiments, the above-described lane alignment masters may operate in various ways to perform lane alignment operations on low speed serial links coupled thereto. For instance, FIG. 3 shows a flowchart 300 providing an example process performed by a lane alignment master for aligning a low speed serial link, according to an example embodiment. FIG. 4 shows a flowchart 400 providing an example process performed by a lane alignment master for providing instance(s) of a first training pattern of data, according to an example embodiment. Furthermore, FIG. 5 depicts a detailed block diagram of lane alignment master 212 coupled to lane alignment slave 234. Lane alignment master 212 of FIGS. 2 and 5 may operate according to flowcharts 300 and 400. Flowcharts 300 and 400 are described with reference to lane alignment master 212 of FIG. 5. It is noted that lane alignment master 232 may also operate according to flowcharts 300 and 400. As shown in FIG. 5, lane alignment master 212 includes a data provider 504, memory 506, transmitter interface 508, and a timer 510. Other structural and operational embodiments will be apparent to persons skilled in the relevant art(s) based on the following discussion regarding flowcharts 300 and 400 and lane alignment master 212.

Flowchart 300 may begin with step 302. In step 302, a first instance of a first training pattern of data over a plurality of first lanes is transmitted by a master of a first device to a slave of a second device. For example, with reference to FIG. 5, lane alignment master 212 provides the first instance of the first training pattern of data to lane alignment slave 234 over the low speed serial lanes of low speed serial link 206. The first training pattern of data may be predetermined and stored in memory 506 (e.g., one or more of a read only memory (ROM), random access memory (RAM), etc.). Data provider 504 provides a request for the first training pattern of data to memory 506 over line(s) 512, and in response, memory 506 provides the first training pattern of data to data provider 504 over line(s) 512. Thereafter, data provider 504 provides the first instance of the first training pattern of data to transmitter interface 508 over line(s) 514. Transmitter interface 508 provides the first instance of the first training pattern of data to selection logic 220 over lines 231, and selection logic 220 provides the first instance of the first training pattern of data to lane alignment slave 234 over the low speed serial lanes of low speed serial link 206.

The first instance of the first training pattern of data may be a repeating data stream that contains one or more control characters that are in accordance to an encoding scheme used for data transmissions to and from transceiver 202 and low speed device 204. The repeating data stream may include designated control character(s) that are used to align the low speed serial lanes of low speed serial link 206.

In accordance to an embodiment where an 8B/10B encoding scheme is used, the first instance of the first training pattern of data is a repeating 8B/10B data stream. The repeating 8B/10B data stream may include designated control character(s) that may be used to align the low speed serial lanes of low speed serial link 206. In an embodiment, the designated control character(s) may be a K28.5 control character.

In step 304, a first indication is received from a slave of the first device that is configured to perform a lane alignment operation on a plurality of second lanes using a second instance of the first training pattern of data received from a master of the second device over the plurality of second lanes. The first indication indicates that the plurality of second lanes has been aligned. For example, with reference to FIG. 5, data provider 504 of lane alignment master 212 receives the first indication from lane alignment slave 214 over line 244. As shown in FIG. 2, lane alignment slave 214 is configured to perform a lane alignment operation on the low speed serial lanes of low speed serial link 208 using a second instance of the first training pattern of data received from lane alignment master 232 over low speed serial link 208. Note that the providing of the first instance of the first training pattern over the lanes of low speed serial link 206 in step 302 may continue (e.g., the pattern may be repeated) until the first indication is received in step 304.

In step 306, a first instance of a second training pattern of data is transmitted over the plurality of first lanes from the master of a first device to the slave of a second device. For example, with reference to FIG. 5, lane alignment master 212 provides the first instance of the second training pattern of data to lane alignment slave 234 over the low speed serial lanes of low speed serial link 206. The second training pattern of data may be predetermined and stored in memory 506. Data provider 504 provides a request for the second training pattern of data to memory 506 over line(s) 512, and in response, memory 506 provides the second training pattern of data to data provider 504 over line(s) 512. Thereafter, data provider 504 provides the first instance of the second training pattern of data to transmitter interface 508 over line(s) 514. Transmitter interface 508 provides the first instance of the second training pattern of data to selection logic 220 over lines 231, and selection logic 220 provides the first instance of the second training pattern of data to lane alignment slave 234 over the low speed serial lanes of low speed serial link 206.

The first instance of the second training pattern of data may be a repeating data stream that contains one or more control characters that are in accordance to an encoding scheme used for data transmissions to and from transceiver 202 and low speed device 204. The repeating data stream may include designated control character(s) that are used to align the low speed serial lanes of low speed serial link 206. In an embodiment, the designated control character(s) of the second training pattern of data may be different than the designated control character(s) of the first training pattern.

In accordance to an embodiment where an 8B/10B encoding scheme is used, the first instance of the second training pattern of data may be a repeating 8B/10B data stream. The repeating 8B/10B data stream may include designated control character(s) that may be used to align the low speed serial lanes of low speed serial link 206. The designated control character(s) may differ than the designated control character(s) of the first training pattern of data. For example, in an embodiment, the designated control character(s) of the second training pattern of data may be a K28.7 control character.

In step 308, a second indication is received from the slave of the first device. The second indication indicates that the slave of the first device has received a second instance of the second training pattern of data from the master of the second device over the plurality of second lanes. For example, with reference to FIG. 5, data provider 504 of lane alignment master 212 receives the second indication from lane alignment slave 214 over line 244. Accordingly, with reference with FIG. 2, the second indication indicates that lane alignment slave 214 has received a second instance of the second training pattern of data from lane alignment master 232 of low speed device 204 over the low speed serial lanes of low speed serial link 208.

In an embodiment, a third instance of the second training pattern of data is transmitted over the plurality of first lanes by the master of the first device to the slave of the second device a predetermined number of times in response to receiving the second indication from the slave of the first device. For example, with reference to FIG. 5, lane alignment master 212 provides the third instance of the second training pattern of data to lane alignment master 232 a predetermined number of times over the low speed serial lanes of low speed serial link 206.

A determination may be made as to whether the third instance of the second training pattern has been transmitted a predetermined number of times. For example, data provider 504 may determine whether the third instance of the second training pattern has been transmitted to lane alignment slave 232 a predetermined number of times. For instance, data provider 504 may maintain a count of the number of times that the third instance of the second training pattern of data has been transmitted to transmitter interface 508.

In response to determining that the third instance of the second training pattern has been transmitted a predetermined number of times, a control signal from the master of the first device is transmitted to selection logic of the first device. The control signal causes the selection logic to provide data received over a high speed serial link to the second device over the plurality of first lanes. For example, with reference to FIG. 5, data provider 504 of lane alignment master 212 provides the control signal to selection logic 220 over line 248. The control signal causes selection logic 220 to provide mission traffic (i.e., data received over high speed serial link 222 that has been de-serialized by data distributor 216).

FIG. 4 depicts a flowchart 400 of an example implementation of step 302 of FIG. 3 in accordance with an embodiment described herein. As shown in FIG. 4, the method of flowchart 400 begins at step 402. In step 402, a first instance of an illegal data pattern is transmitted over the plurality of first lanes from the master of the first device to the slave of the second device for a predetermined time period. The first instance of the illegal data pattern may be transmitted before transmitting the first instance of the first training pattern in order to disrupt the data stream so that the first instance of the first training pattern is not mistakenly identified as mission traffic (e.g., data received from a high speed serial link).

With reference to FIG. 5, lane alignment master 212 provides the first instance of the illegal data pattern to lane alignment slave 234 over low speed serial lanes of low speed serial link 206 for a predetermined time period. In an embodiment, the illegal data pattern may be predetermined and stored in memory 506. In accordance with this embodiment, data provider 504 provides a request for the illegal data pattern to memory 506 over line(s) 512, and in response, memory 506 provides the illegal data pattern to data provider 504 over line(s) 512. In another embodiment, the illegal data pattern may be generated by a pseudo-random generator included in lane alignment slave 212. In either embodiment, data provider 504 provides the illegal data pattern to transmitter interface 508 over line(s) 514. Transmitter interface 508 provides the illegal data pattern to selection logic 220 over lines 231, and selection logic 220 provides the illegal data pattern to lane alignment slave 234 over the low speed serial lanes of low speed serial link 206.

In step 404, a determination is made as to whether the predetermined time period has expired. In response to determining that the predetermined time period has expired, flow continues to step 406. Otherwise, flow returns to step 402. With reference to FIG. 5, timer 510 may determine that the predetermined time period has expired. For example, upon transmitting the first instance of the illegal data pattern, timer 510 is initiated. Timer 510 continues to execute until the predetermined time period expires. Upon expiration, timer 510 provides a control signal to data provider 504 that causes data provider 504 to stop transmitting the illegal data pattern to transmitter interface 508.

In an embodiment, the illegal data pattern may be transmitted over low speed serial link 206 in response to lane alignment slave 214 detecting a loss of synchronization or alignment of low speed serial link 208 sometime after low speed serial link 208 was already synchronized and/or aligned. This is performed to re-initiate the lane alignment operations for low speed serial link 208. In accordance with this embodiment, the lane alignment master of the first device may receive a third indication from the lane alignment slave of the first device. The third indication indicates that a number of detected violations of an encoding scheme used to transmit data between the first device and the second device over the plurality of second lanes has reached a predetermined threshold. With reference to FIG. 5, data provider 504 of lane alignment master 212 receives the third indication from lane alignment slave 214 over line 244. In response to receiving the third indication, the first instance of the illegal data pattern is transmitted from the master of the first device to the slave of the second device over the plurality of first lanes for the predetermined time period.

In step 406, the first instance of the first training pattern of the data is transmitted over the plurality of first lanes from the master of the first device to the slave of the second device in response to determining that the predetermined time period has expired.

Example Lane Alignment Slave Embodiments

Figure 6:
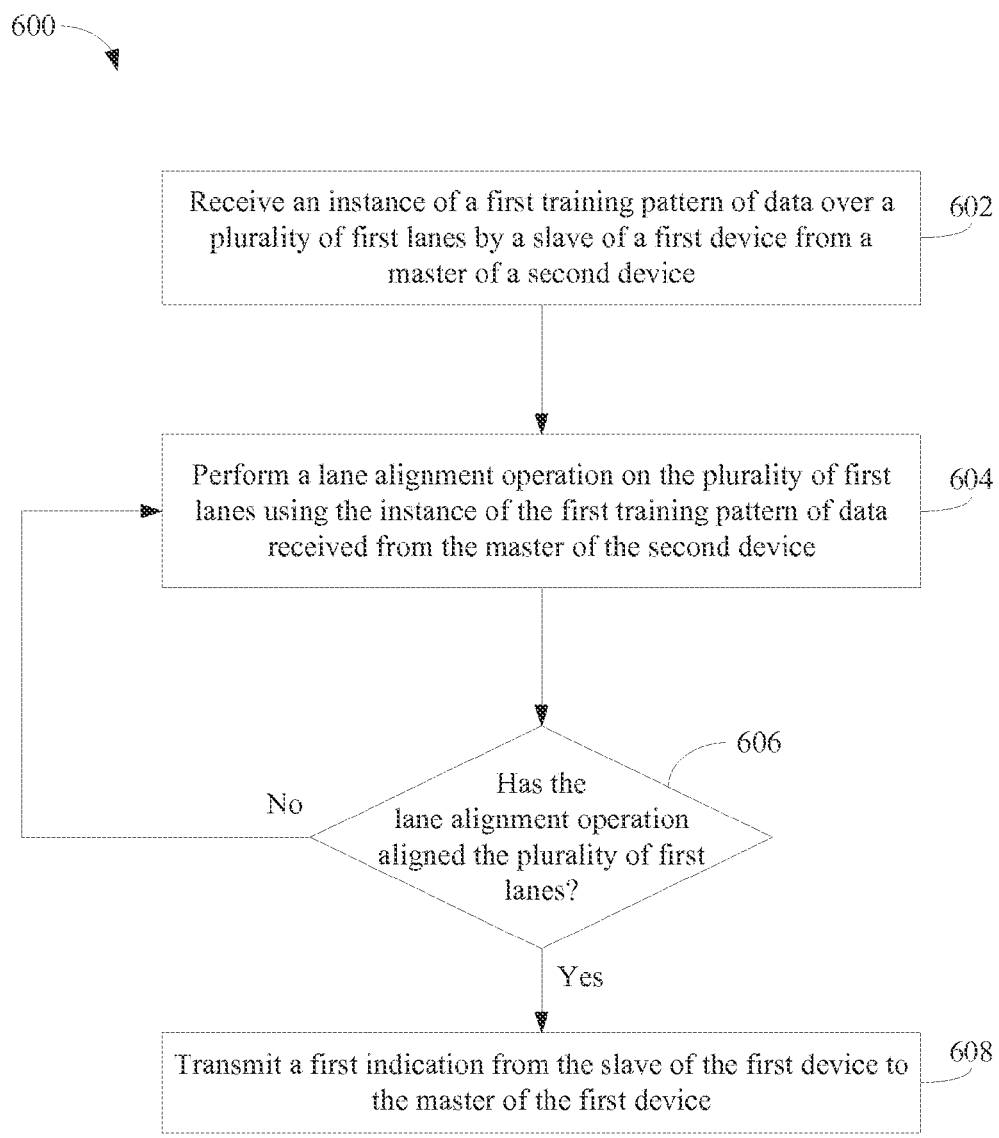
FIG. 6 shows a flowchart providing an example process performed by a lane alignment slave for aligning a low speed serial link, according to an example embodiment.
Figure 7:
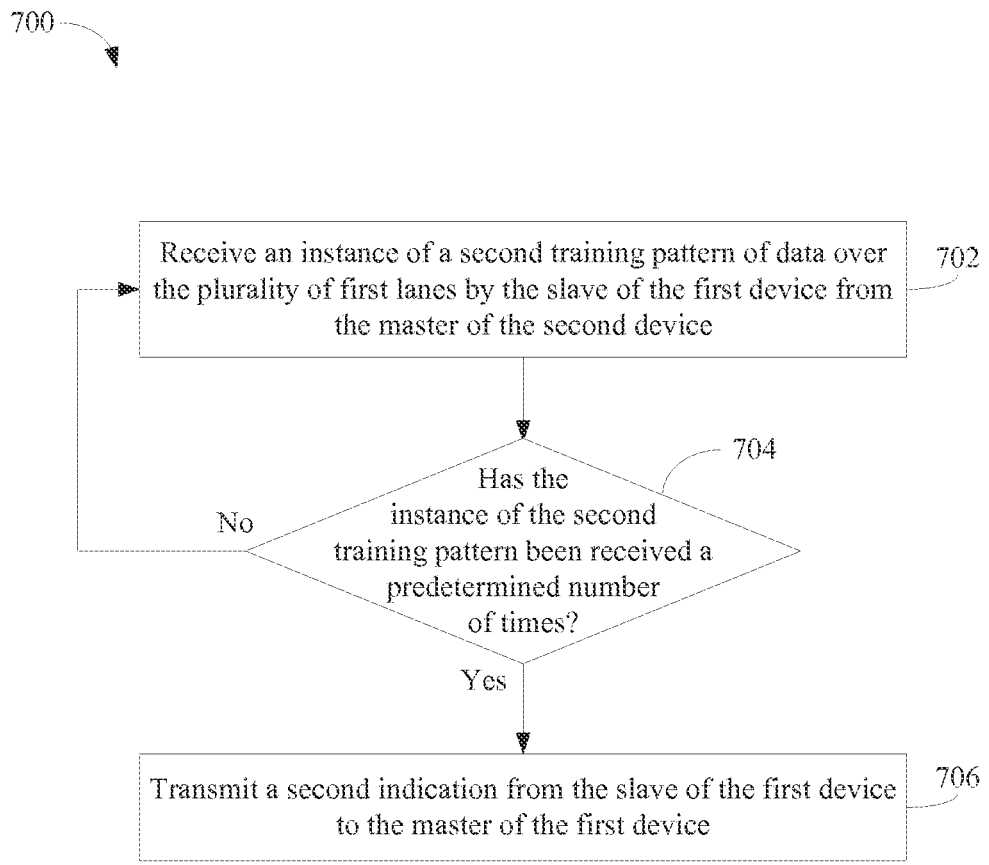
FIG. 7 shows a flowchart providing an example process performed by a lane alignment slave of a first device to determine whether a lane alignment slave of a second device has aligned a low speed serial link coupled thereto, according to an example embodiment.
Figure 8:
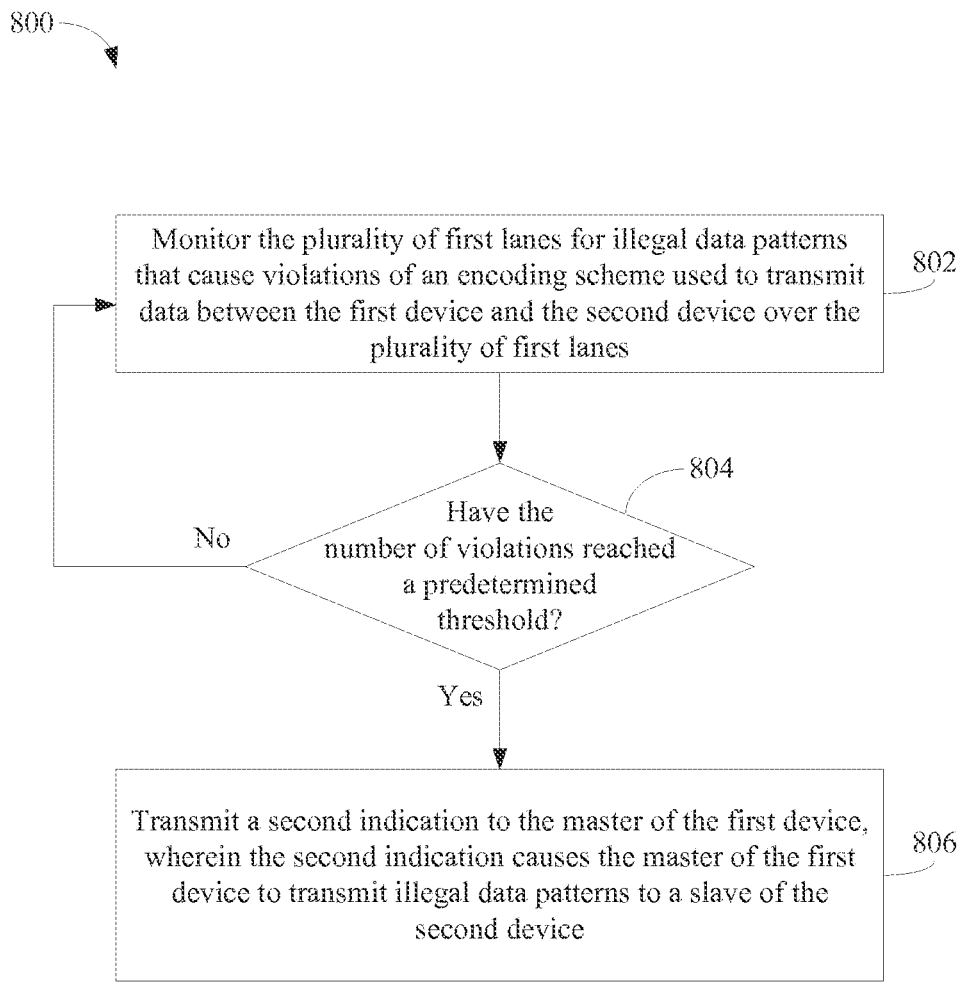
FIG. 8 shows a flowchart providing an example process performed by a lane alignment slave to re-initiate lane alignment operations, according to an example embodiment.
Figure 9:
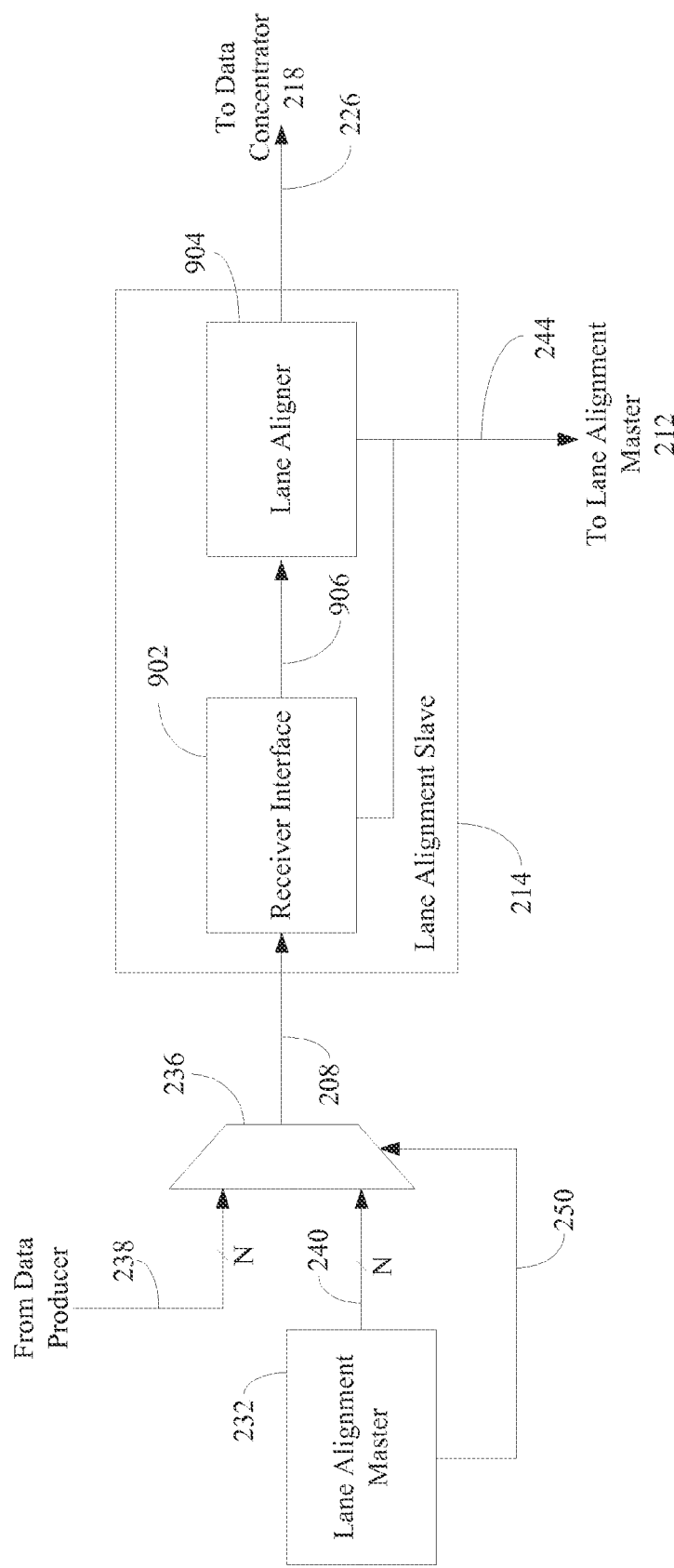
FIG. 9 depicts a block diagram of a lane alignment slave of a first device coupled to a lane alignment master of a second device, according to an example embodiment.

In embodiments, the above-described lane alignment slaves may operate in various ways to align low speed serial links coupled thereto. For instance, FIG. 6 shows a flowchart 600 providing an example process performed by a lane alignment slave to align a low speed serial link, according to an example embodiment. FIG. 7 shows a flowchart 700 providing an example process performed by a lane alignment slave of a first device to determine whether a lane alignment slave of a second device has aligned a low speed serial link coupled thereto, according to an example embodiment. FIG. 8 shows a flowchart 800 providing an example process performed by a lane alignment slave to re-initiate lane alignment operations, according to an example embodiment. Furthermore, FIG. 9 depicts a detailed block diagram of lane alignment slave 214 coupled lane alignment master 232, according to an example embodiment. Lane alignment slave 214 of FIGS. 2 and 9 may operate according to flowcharts 600, 700, and 800. Flowcharts 600, 700, and 800 are described with reference to lane alignment slave 214 of FIG. 9. It is noted that lane alignment slave 214 may also operate according to flowcharts 600, 700, and 800. As shown in FIG. 9, lane alignment slave 214 includes a receiver interface 902 and a lane aligner 904. Other structural and operational embodiments will be apparent to persons skilled in the relevant art(s) based on the following discussion regarding flowcharts 600, 700, and 800 and lane alignment slave 214.

Flowchart 600 may begin with step 602. In step 602, an instance of a first training pattern of data is received over a plurality of first lanes by a slave of a first device from a master of a second device. For example, with reference to FIG. 9, receiver interface 902 of lane alignment slave 214 receives the instance of the first training pattern of data from lane alignment master 232 over the low speed serial lanes of low speed serial link 208. Receiver interface 902 provides the instance of the first training pattern of data to lane aligner 904 over line 906.

The first instance of the first training pattern of data may be a repeating data stream that contains one or more control characters that are in accordance to an encoding scheme used for data transmissions to and from transceiver 202 and low speed device 204. The repeating data stream may include designated control character(s) (e.g., K28.5 control characters) that are used to align the low speed serial lanes of low speed serial link 208.

In step 604, the slave of the first device performs a lane alignment operation on the plurality of first lanes using the instance of the first training pattern of data received from the master of the second device. For example, with reference to FIG. 9, lane aligner 904 is configured to perform the lane alignment operation on the low speed serial lanes of low speed serial link interface 208. For instance, lane aligner 904 may compare control characters and/or other aspects of the data received on the lanes of low speed serial link 208 to a predetermined order for such control characters, to determine whether the data on the lanes is being received in the predetermined order.

For example, in a four lane embodiment, lane aligner 904 may analyze data received on each of the first-fourth lanes to determine whether four control characters C1-C4 corresponding to a point in time are received at a same time on the four lanes. If the four control characters C1-C4 are received across the four lanes at a same time, the lanes may not be suffering from skew. If the four control characters C1-C4 are not received at a same time, but instead other control characters corresponding to other times are received on one or more of the lanes at that time, the lanes may be suffering from latency skew, and may therefore need one or more delays introduced. For instance, if control characters C5, C6, C3, and C8 are received on the first-fourth lanes at a second time, where control characters C1-C4 correspond to a first time and control characters C5-C8 correspond to the second time, this may indicate that the first, second, and fourth lanes may need a delay introduced so that the slower third lane is aligned with the first, second, and fourth lanes. Note that in other embodiments, lane aligner 904 may be configured to align lanes in other ways.

In an embodiment, lane aligner 904 introduces a delay into one or more lanes of the low speed serial lanes of low speed serial link 208 such that the designated control character(s) received over each of the low speed serial lanes are properly aligned. Lane aligner 904 uses the designated control character(s) included in the instance of the first training pattern of data received from lane alignment master 212 to synchronize and de-skew low speed serial link 208. The delay(s) introduced by lane aligner 904 are maintained so that subsequent data transmissions between transceiver 202 and low speed device 204 are aligned. The delays are maintained until low speed serial link 208 experiences a loss of synchronization or alignment.

In another embodiment, lane alignment slave 234 may also be configured to align the low speed serial lanes of low speed serial 208 using an instance of a second training pattern of data that is transmitted by lane alignment master 232 (as is explained below). In such an embodiment, the first training pattern of data of step 602 is the second training pattern of data.

In step 606, a determination is made as to whether the lane alignment operation has aligned the plurality of first lanes. If a determination is made that the lane alignment operation has aligned the plurality of first lanes, flow continues to step 608. Otherwise, flow returns to step 604. In an embodiment, if the lane alignment operation has not successfully aligned the plurality of first lanes within a predetermined time period, a determination is made that a loss of synchronization has occurred on the plurality of first lanes. In response to such a determination, synchronization and alignment of the plurality of first lanes is re-initiated. With reference to FIG. 9, lane aligner 904 determines whether the lane alignment operation has aligned the low speed serial lanes of low speed serial link 208.

In step 608, a first indication is transmitted from the slave of the first device to the master of the first device. With reference to FIG. 9, lane aligner 904 of lane alignment slave 214 provides the first indication to lane alignment master 212 over line 244. The first indication indicates that that lane alignment slave 214 has aligned the low speed serial lanes of low speed serial link 208.

After the slave of the first device has aligned the plurality of first lanes, the slave of the first device determines whether the slave of the second device has aligned a plurality of second lanes coupled thereto. The slave of the first device determines whether the slave of the second device has successfully aligned the plurality of second lanes coupled thereto by performing the steps shown in flowchart 700 of FIG. 7.

Flowchart 700 may begin with step 702. In step 702, an instance of a second training pattern of data is received over the plurality of first lanes by a slave of the first device from a master of the second device. For example, with reference to FIG. 9, receiver interface 902 of lane alignment slave 214 receives the instance of the second training pattern of data from lane alignment master 232 over the low speed serial lanes of low speed serial link 208. Receiver interface 902 provides the instance of the second training pattern of data to lane aligner 904 over line 906.

The instance of the second training pattern of data may be a repeating data stream that contains one or more control characters that are in accordance to an encoding scheme used for data transmissions to and from transceiver 202 and low speed device 204. In an embodiment, the second training pattern of data and the first training pattern of data may be different patterns of data. For example, the repeating data stream of the second training pattern of data may include different designated control character(s) than the first training pattern of data (e.g., K28.7 control characters instead of K28.5 control characters).

In step 704, a determination is made as to whether the instance of the second training pattern has been received a predetermined number of times. If a determination is made that the instance of the second training pattern has been received a predetermined number of times, flow continues to step 706. Otherwise, flow returns to 704. In an embodiment, if the instance of the second training pattern has not been received a predetermined number of times, a determination is made that a loss of synchronization or alignment has occurred on the plurality of first lanes. In response to such a determination, synchronization and alignment of the plurality of first lanes is re-initiated. With reference to FIG. 9, receiver interface 902 is configured to determine whether the instance of the second training pattern has been received a predetermined number of times.

In step 706, a second indication is transmitted from the slave of the first device to the master of the first device. For example, with reference to FIG. 9, receiver interface 902 of lane alignment slave 214 provides the second indication to lane alignment master 212 over line 244. The second indication indicates that that lane alignment slave 234 has aligned the low speed serial lanes of low speed serial link 206.

In an embodiment, data received over the plurality of first lanes subsequent to transmitting the second indication to the master of the first device (i.e., mission traffic) is transmitted to a data concentrator of the first device. The data concentrator is configured to serialize the data received over the plurality of first lanes for transmission over a high speed serial link. For example, with reference to FIG. 9, lane aligner 904 provides data received over the low speed serial lanes of low speed serial link 208 to data concentrator 218, which serializes the data and provides the data to high speed serial link 228 (as shown in FIG. 2).

After a determination is made that the plurality of first lanes and the plurality of second lanes have been aligned, the plurality of first lanes and the plurality of second lanes may be monitored to determine whether a loss of synchronization has occurred. In response to determining that a loss of synchronization has occurred, the lane alignment operations are re-initiated. The slave of the first device may re-initiate the lane alignment operations by performing the steps of flowchart 800 of FIG. 8.

Flowchart 800 may begin with step 802. In step 802, the plurality of first lanes are monitored for illegal data patterns that cause violations of an encoding scheme used to transmit data between the first device and the second device over the plurality of first lanes. The illegal data patterns may take the form of any bit stream that does not conform to the particular encoding scheme (e.g., an 8B/10 encoding scheme) used to transmit and receive data between the first device and the second device. With reference to FIG. 9, receiver interface 902 is configured to monitor the low speed serial lanes of low speed serial link 208 for the illegal data patterns.

In step 804, a determination is made as to whether the number of violations reaches a predetermined threshold. If a determination is made that the number of violations reaches the predetermined threshold, flow continues to step 806. Otherwise, flow returns to step 802. With reference to FIG. 9, receiver interface 902 determines whether the number of the violations reaches the predetermined threshold. For example, receiver interface 902 may maintain a count of the number of times that a violation has been detected.

In step 806, a second indication is transmitted to the master of the first device. The second indication causes the master of the first device to provide illegal data patterns to a slave of the second device. Thereafter, the master of the first slave device begins the lane alignment operations by transmitting instances of the first training pattern of data as described earlier. The illegal data patterns are transmitted before transmitting the first instance of the first training pattern in order to disrupt the data stream so that the first instance of the first training pattern is not mistakenly identified as mission traffic. With reference to FIG. 9, receiver interface 902 of lane alignment slave 214 provides the second indication to lane alignment master 212 over line 244.

In an embodiment, the plurality of first lanes and the plurality of second lanes may also be monitored to determine whether a loss of alignment has occurred. In response to determining that a loss of alignment has occurred, the lane alignment operations are re-initiated. For example, the slave of the first device may monitor the plurality of first lanes to determine whether the plurality of the first lanes have lost alignment. In response to a determination that the plurality of the first lanes have lost alignment, a third indication is transmitted to the master of the first device. The third indication causes the master of the first device to provide illegal data patterns to the slave of the second device.

For example, with reference to FIG. 9, lane aligner 904 determines whether the low speed serial lanes of low speed serial link 208 have lost alignment. In response to determining that the low speed serial lanes of low speed serial link 208 have lost alignment, lane alignment slave 214 provides the third indication to lane aligner 904 of lane alignment master 212 over line 244. The third indication causes lane alignment master 212 to provide illegal data patterns to lane alignment slave 234 to disrupt the data stream before transmitting the first instance of the first training pattern to lane alignment slave 234, which re-initiates the lane alignment operations.

Further Example Embodiments

Communication systems may include various types of devices that include transceivers to communicate data between a variety of devices. Embodiments described herein may be included in transceivers of such devices. For instance, embodiments may be included in mobile devices (laptop computers, handheld devices such as mobile phones (e.g., cellular and smart phones), handheld computers, handheld music players, and further types of mobile devices), desktop computers and servers, computer networks, and telecommunication networks.

Embodiments can be incorporated into various types of communication systems, such as intra-computer data transmission structures (e.g., Peripheral Component Interconnect (PCI) Express bus), telecommunication networks, traditional and wireless local area networks (LANs and WLANs), wired and wireless point-to-point connections, optical data transmission systems (e.g., short haul, long haul, etc.), high-speed data transmission systems, coherent optical systems and/or other types of communication systems using transceivers.

A device, as defined herein, is a machine or manufacture as defined by 35 U.S.C. §101. A device may comprise, for example but not limited to a receiver, a transmitter, a transceiver, a communication device, a network device, etc. Devices may be digital, analog or a combination thereof. Devices may include one or more processors (e.g., central processing units (CPUs), microprocessors, etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Note that as described in embodiments above, data and other information may be transmitted over one or more "lines", which may each include one or more electrically signal conductors (e.g., traces, integrated circuit routes, etc.). In other embodiments, such data and/or information may be communicated/processed within a processor or in another manner that does not use dedicated electrical signal conductors.

Techniques, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

For example, each of transceiver 102, in-band lane aligner 104, transceiver 202, low speed device 204, in-band lane aligner 210, lane alignment master 212, lane alignment slave 214, data distributor 216, data concentrator 218, selection logic 220, in-band lane aligner 230, lane alignment master 232, lane alignment slave 234, selection logic 236, data provider 504, transmitter interface 508, timer 510, receiver interface 902, lane aligner 904, flowchart 300, flowchart 400, flowchart 600, flowchart 700, and flowchart 800 (including each step of flowcharts 300, 400, 600, 700, and 800) can be implemented at least partially as control logic that may be stored on a computer useable storage medium or computer readable storage medium, which can be executed by one or more processors to operate as described herein.

Computer readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method, comprising:
   transmitting a first instance of a first training pattern of data over a plurality of first lanes by a lane alignment master of a first device to a lane alignment slave of a second device;
   receiving a first indication from a lane alignment slave of the first device that is configured to perform a lane alignment operation on a plurality of second lanes using a second instance of the first training pattern of data received from a lane alignment master of the second device over the plurality of second lanes, the first indication indicating that the plurality of second lanes has been aligned;
   transmitting a first instance of a second training pattern over the plurality of first lanes from the lane alignment master of the first device to the lane alignment slave of the second device in response to receiving the first indication; and
   receiving a second indication from the lane alignment slave of the first device, the second indication indicating that the lane alignment slave of the first device has received a second instance of the second training pattern of data from the lane alignment master of the second device over the plurality of second lanes.

2. The method of claim 1, wherein said transmitting a first instance of a first training pattern of data over a plurality of first lanes from a lane alignment master of the first device to a lane alignment slave of the second device comprises:
   transmitting a first instance of an illegal data pattern over the plurality of first lanes from the lane alignment master of the first device to the lane alignment slave of the second device for a predetermined time period;
   determining whether the predetermined time period has expired; and
   transmitting the first instance of the first training pattern of the data over the plurality of first lanes from the lane alignment master of the first device to the lane alignment slave of the second device in response to determining that the predetermined time period has expired.

3. The method of claim 2, wherein said transmitting a first instance of an illegal data pattern over the plurality of first lanes from the lane alignment master of the first device to the lane alignment slave of the second device for a predetermined time period comprises:
   receiving a third indication from the lane alignment slave of the first device, the third indication indicating that a number of detected violations of an encoding scheme used to transmit data between the first device and the second device over the plurality of second lanes reached a predetermined threshold; and
   transmitting the first instance of the illegal data pattern over the plurality of first lanes from the lane alignment master of the first device to the lane alignment slave of the second device for the predetermined time period in response to receiving the third indication from the lane alignment slave of the first device.

4. The method of claim 1, further comprising:
   transmitting a third instance of the second training pattern over the plurality of first lanes from the lane alignment master of the first device to the lane alignment slave of the second device a predetermined number of times in response to receiving the second indication from the lane alignment slave of the first device.

5. The method of claim 4, further comprising:
   determining that the third instance of the second training pattern has been transmitted a predetermined number of times;
   transmitting a control signal from the lane alignment master of the first device to selection logic of the first device in response to determining that the third instance of the second training pattern has been transmitted a predetermined number of times, the control signal enabling the selection logic to provide data received over a high speed serial link to the second device over the plurality of first lanes.

6. The method of claim 1, wherein the first training pattern of data and the second training pattern of data are different patterns of data.

7. A method, comprising:
   receiving an instance of a first training pattern of data over a plurality of first lanes by a lane alignment slave of a first device from a lane alignment master of a second device;
   performing a lane alignment operation on the plurality of first lanes using the instance of the first training pattern of data received from the lane alignment master of the second device;
   determining whether the lane alignment operation has aligned the plurality of first lanes; and
   transmitting a first indication from the lane alignment slave of the first device to the lane alignment master of the first device in response to determining that the lane alignment operation has aligned the plurality of first lanes.

8. The method of claim 7, further comprising:
   receiving an instance of a second training pattern of data over the plurality of first lanes by the lane alignment slave of the first device from the lane alignment master of the second device;
   determining whether the instance of the second training pattern of data has been received a predetermined number of times; and
   transmitting a second indication from the lane alignment slave of the first device to the lane alignment master of the first device in response to determining that the instance of the second training pattern of data has been received a predetermined number of times.

9. The method of claim 8, further comprising:
transmitting data received over the plurality of first lanes to concentrator logic of the first device subsequent to transmitting the second indication from the lane alignment slave of the first device to the lane alignment master of the first device, wherein the concentrator logic is configured to serialize the data received over the plurality of first lanes for transmission over a high speed serial link.

10. The method of claim 7, wherein the first training pattern of data and the second training pattern of data are the same patterns of data.

11. The method of claim 7, wherein the first training pattern and the second training pattern are different patterns of data.

12. The method of claim 7, further comprising:
monitoring the plurality of first lanes to determine whether the plurality of first lanes have lost alignment; and
transmitting a second indication to the lane alignment master of the first device in response to determining that the plurality of first lanes have lost alignment, wherein the second indication causes the lane alignment master of the first device to provide illegal data patterns to a lane alignment slave of the second device.

13. The method of claim 7, further comprising:
monitoring the plurality of first lanes for illegal data patterns that cause violations of an encoding scheme used to transmit data between the first device and the second device over the plurality of first lanes;
determining whether a number of the violations reaches a predetermined threshold; and
transmitting a second indication to the lane alignment master of the first device in response to determining that the number of the violations reaches the predetermined threshold, wherein the second indication causes the lane alignment master of the first device to provide illegal data patterns to a lane alignment slave of the second device.

14. A lane alignment slave of a first device configured to align a plurality of first lanes, comprising:
a receiver interface coupled to the plurality of first lanes, the receiver interface configured to receive an instance of a first training pattern of data over the plurality of first lanes from a lane alignment master of a second device; and
a lane aligner configured to perform a lane alignment operation on the plurality of first lanes using the instance of the first training pattern of data received from the lane alignment master of the second device and to determine whether the lane alignment operation has aligned the plurality of first lanes,
wherein the lane aligner provides a first indication to a lane alignment master of the first device in response to a determination that the lane alignment operation has aligned the plurality of first lanes.

15. The lane alignment slave of the first device of claim 14, wherein the receiver interface is further configured to:
receive an instance of a second training pattern of data over the plurality of first lanes from the lane alignment master of the second device;
determine whether the instance of the second training pattern of data has been received a predetermined number of times; and
provide a second indication to the lane alignment master of the first device in response to a determination that the instance of the second training pattern of data has been received a predetermined number of times.

16. The lane alignment slave of the first device of claim 15, wherein the lane aligner is further configured to:
provide data received over the plurality of first lanes subsequent to transmitting the second indication to the lane alignment master of the first device to concentrator logic of the first device, wherein the concentrator logic is configured to serialize the data received over the plurality of first lanes for transmission over a high speed serial link.

17. The lane alignment slave of the first device of claim 14, wherein the first training pattern of data and the second training pattern of data are the same patterns of data.

18. The lane alignment slave of the first device of claim 14, wherein the first training pattern and the second training pattern are different patterns of data.

19. The lane alignment slave of the first device of claim 14, wherein the lane aligner is further configured to:
monitor the plurality of first lanes to determine whether the plurality of first lanes have lost alignment; and
provide a second indication to the lane alignment master of the first device in response to a determination that the plurality of first lanes have lost alignment, wherein the second indication causes the lane alignment master of the first device to provide illegal data patterns to a lane alignment slave of the second device.

20. The lane alignment slave of the first device of claim 14, wherein the lane aligner is further configured to:
monitor the plurality of first lanes for illegal data patterns that cause violations of an encoding scheme used to transmit data between the first device and the second device over the plurality of first lanes;
determine whether a number of the violations reaches a predetermined threshold; and
provide a second indication to the lane alignment master of the first device in response to a determination that the number of the violations reaches the predetermined threshold, and wherein the second indication causes the lane alignment master of the first device to provide illegal data patterns to a lane alignment slave of the second device.

* * * * *